United States Patent [19]

Bialkowski

[11] Patent Number: 4,585,301
[45] Date of Patent: Apr. 29, 1986

[54] OPTICALLY ACTUATED OPTICAL SWITCH APPARATUS AND METHODS

[75] Inventor: Stephen E. Bialkowski, Smithfield, Utah

[73] Assignee: Utah State Universtiy Foundation, Logan, Utah

[21] Appl. No.: 726,087

[22] Filed: Apr. 23, 1985

[51] Int. Cl.$^4$ .............................................. G02B 6/36
[52] U.S. Cl. ................................... 350/96.20; 350/354
[58] Field of Search ...................... 350/96.20, 353, 354

[56] References Cited

U.S. PATENT DOCUMENTS

| | | | |
|---|---|---|---|
| 3,408,131 | 10/1968 | Kapany | 350/96 |
| 3,434,779 | 3/1969 | Damen et al. | 350/169 |
| 3,492,492 | 1/1970 | Ballman et al. | 250/225 |
| 4,190,811 | 2/1980 | Alcock et al. | 331/94.5 |
| 4,208,094 | 6/1980 | Tomlinson, III et al. | 350/96.20 |
| 4,239,330 | 12/1980 | Ashkin et al. | 350/96.18 |
| 4,304,460 | 12/1981 | Tanaka et al. | 350/96.16 |
| 4,352,982 | 10/1982 | Forward et al. | 250/214 |
| 4,365,862 | 12/1982 | Terui et al. | 350/96.13 |
| 4,408,831 | 10/1983 | Sakaguchi et al. | 350/269 |
| 4,455,643 | 3/1982 | Smith et al. | 370/4 |

OTHER PUBLICATIONS

Goldhar, "Beam Deflecting Optical Switch Using Volumetric Thermal Gratings", 23, Applied Optics, 113 (1984).
Long et al., "Pulsed Infrared Laser Thermal Lens Spectrophotometric Determination of Trace-Level Gas--Phase Analytes: Quantitation of Parts per Billion Dichlorodifluoromethane," 56, Analytical Chemistry, 2806 (1984).
Morimoto et al., "A Picosecond Optical Gate Using Photo-Induced Grating", Jap. Journal of Applied Physics, vol. 20, #6, 6-1981, pp. 1129-1133.
Keyes, "Thermal Limitations in Optical Logic," 8, Applied Optics, 2549 (1969).
Bjorkholm et al., "cw Self-Focusing and Self-Trapping of Light in Sodium Vapor," 32, Physical Review Letters, 129 (1974).
Glass, "The Photorefractive Effect," 17, Optical Engineering, 470 (1978).
Jackson et al., "Photothermal Deflection Spectroscopy and Detection," 20, Applied Optics, 1333 (1981).
Kaplan, "Theory of Plane Wave Reflection and Refraction by the Nonlinear Interface," Optical Bistability at 447 (1981).
Smith et al., "Optical Properties of Nonlinear Interfaces," Optical Bistability at 463 (1981).
Fork, "Physics of Optical Switching," 26, The American Physical Society, 2049 (1982).
Aamodt et al., "Thermal Effects in Phothermal Spectroscopy and Photothermal Imaging," 54, Applied Physics, 581 (1983).
Abraham et al., "The Optical Computer," 248, Scientific American, 85 (1983).
Becker et al., "Wide-Band Electrooptic Guided-Wave Analog-to-Digital Converters," 72, Proceedings of the IEEE, 802 (1984).

(List continued on next page.)

Primary Examiner—John Lee
Assistant Examiner—Lester E. Rushin
Attorney, Agent, or Firm—Workman, Nydegger & Jensen

[57] ABSTRACT

A switch capable of switching an optical beam without employing conventional mechanical, electrical, or optical devices. The switch includes a switching medium which may be a solid, liquid, gas, or supercritical gas. A signal or switched beam is directed into and through the switching medium. In order to change the path of the signal beam as it travels through the switching medium, the refractive index of the switching medium is changed. This change in refractive index is caused by a control beam selectively directed into the switching medium. The control beam produces a transient refractive index gradient within the switching medium. This gradient may be a thermal gradien and may constitute a thermal lens. The switch of the current invention is capable of picosecond response times and may serve as a fiber optics communications switch as well as an element in an optical computer.

36 Claims, 7 Drawing Figures

OTHER PUBLICATIONS

Bialkowski, "The Effect of Mass Diffusion in Gas Phase Thermal Lens Experiments," 104, Chemical Physics Letters, 448 (1984).

Fang et al., "The Thermal Lens in Absorbent Spectroscopy," Ultrasensitive Laser Spectroscopy at 175 (1983).

"Fast-Responding Photorefractive Crystals Operate at Near-Infrared Wavelengths," Laser Focus/Electro-Optics, Technology Report at 22 (1984).

Lea, "Optical Modulators Based on Electrocapillarity," 465, Spatial Light Modulators and Applications, 12 (1984).

Moslehi et al., "Fiber-Optic Lattice Signal Processing," 72, Proceedings of the IEEE, 909 (1984).

Petts et al., "A Real-Time Optical Image Processing System," 465, Spatial Light Modulators and Applications, 129 (1984).

Rousset et al., "Influence of Radiative and Convective Transfers in a Photothermal Experiment," 56, J. Applied Physics, 2093 (1984).

Sawchuk et al., "Digital Optical Computing," 72, Proceedings of the IEEE, 758 (1984).

Schroeder et al., "Single Grating Integrated Optical Autocorrelation Device," 465, Spatial Light Modulators and Applications, 135 (1984).

"Spatial Switching System Uses Photo-Induced Holographic Gratings," Laser Focus/Electro-Optics, Technology Report at 46 (1984).

Williams et al., "Optical Switching and $n_2$ Measurements in $CS_2$," 50, Optics Communications, 256 (1984).

Brooks, "Micromechanical Light Modulators on Silicon," 24, Optical Engineering, 101 (1985).

Clymer, "Optical Computer Switching Network," 24, Optical Engineering, 74 (1985).

Freese, "Symposium: Optics Along the Rio Grande Research Corridor," at 55 (1985).

Loiseaux et al., "Dynamic Optical Cross-Correlator Using a Liquid Crystal Light Valve and a Bismuth Silicon Oxide Crystal in the Fourier Plane," 24, Optical Engineering, 144 (1985).

Nicholaisen et al., "Pulsed Infrared Laser Thermal Lens Spectrophotometry of Flowing Gas Samples," 57, Analytical Chemistry, 758 (1985).

Optical Society of America, "Topical Meeting on Optical Computing," Optics News at 29 (1985).

Payghambarian et al., "Optical Bistability for Optical Signal Processing and Computing," 24, Optical Engineering, 68 (1985).

Tanguay, "Materials Requirements for Optical Processing and Computing Devices," 24, Optical Engineering, 2 (1985).

Bray et al., "Chapter 36: State of the Art of the Optical Logic Element," 673 (n.d.).

Cooke-Yarborough, "Chapter 18: A Proposed Opto-Electronic Method of Achieving Very Fast Digital Logic," 321 (n.d.).

Kosonocky, "Chapter 16: Laser Digital Devices," 269 (n.d.).

OPTICALLY ACTUATED OPTICAL SWITCH APPARATUS AND METHODS

BACKGROUND

1. The Field of the Invention

This invention relates to the field of optics, and more particularly, to the use of optically induced changes in the refractive index of a medium for use as an optical switch.

2. The Prior Art

The importance of optics in many fields of technology has rapidly increased in the recent past and continues to increase at an ever faster pace. For example, the use of optical fibers in communications is becoming increasingly accepted and their use is expanding exponentially. In addition, the use of optical devices such as lasers is increasing in fields as diverse as medicine, defense, and communications.

With the increasing use of optical devices comes an increasing need for methods and apparatus for controlling the path of the light used in such devices. The basic types of devices for controlling the path of the light are well known and may be generally thought of as including conventional mirrors and lenses.

As the uses for optical devices increases, the need for efficient methods for controlling the path of light, particularly in the form of optical switches, also becomes more critical. Most conventional optical switches involve the use of mirrors and lenses positioned in such a manner as to provide the desired switching of a light beam. These mirrors and lenses may be controlled by some method for changing their position, such as a motor. As a result the mirror or lens may be moved into or out of the light paths and the angle at which the light beam intersects the mirror or lens may be varied.

Several switching devices of the type discussed above have been developed and are well-known in the art. Many of these devices are used in switching light beams carried by optical fiber communication systems. It is often critical for light carried by one optical fiber to be transferred to another optical fiber so that the desired communication link may be established.

In one such device, two quarter-period graded refractive index ("GRIN") lenses are aligned so that one surface of each lens abuts the other lens. On the surface of the first lens which does not abut the second lens are one or more input optical fibers. On the opposite surface of the second lens are a plurality of output fibers. The two lenses are mounted so that they are capable of being turned with respect to one another.

In order to switch an input beam to a different output fiber, the lenses of such prior art devices are simply rotated with respect to one another until the input beam is directed toward the desired output fiber. Thus, this type of device may be constructed by combining conventional GRIN lenses and mechanical devices in order to achieve the desired beam switching.

Another approach to beam switching, which also employs conventional technology, combines lenses and mirrors, or other reflecting surfaces. In this type of device a plurality of optical fibers are connected to one surface of a GRIN lens. On the opposite end of the lens, however, is a movable reflecting surface. Therefore, light passing through the optical fibers into the lens will strike the reflecting surface and then be reflected back through the lens. If positioned correctly, the reflecting surface can direct a light beam into the desired optical fiber. By changing the position of the reflecting surface, the reflecting surface can switch a light beam from fiber to fiber as desired.

An additional attempt by others to provide a usable optical switch involves the use of a transparent sheet of material with a relatively small area covered with opaque reflecting material. Two perpendicular beams are passed through the reflecting sheet. The material is positioned at an angle with respect to the beams such that when the material is in a first position, the first beam passes through the material to a receptor. When the material is moved to a second position, the first beam is blocked from the receptor by the reflecting surface. However, the second beam strikes the opposite side of the reflecting surface and is directed to the receptor. Thus, by moving the material and thus changing the position of the reflecting surface, it is possible to select whether the first or second beam reaches the receptor. Again, conventional mechanical and optical devices are combined in this device to provide an optical switch.

Recently, somewhat more exotic switching devices have been developed using more advanced physical concepts. For example, certain devices have been developed which take advantage of the unique physical properties of the interface between a linear and an optically non-linear material. A non-linear material is generally one whose refractive index changes with changes in the intensity of light impacting the material.

For example, an input light beam may be propagated in a linear material with a particular intensity and angle of incidence on the interface between the linear and non-linear material such that the beam is totally reflected at the interface. Since the reflectivity of the interface is intensity dependent, however, if the intensity of the input beam is increased at the point it strikes the linear-nonlinear interface, at some particular intensity the beam will be only partially reflected. The remaining portion of the beam will cross the interface into the non-linear medium.

The same effect can be accomplished by directing a second "control beam" at the point where the input beam contacts the interface such that the combined intensities of the control beam and the input beam are sufficient to cause a portion of the input beam to pass into the non-linear medium.

Another application of the phenomena of intensity-dependent reflectivity is in the construction of a switch used to switch an infrared signal laser. In this device, an infrared laser is directed at a semiconductor material. The semiconductor material is chosen so that it is ordinarily transparent to the laser beam. Added to the system is a "control beam" which is selected so that it is sufficiently high frequency to produce free carriers in the semiconductor. When sufficient free carriers are produced within the semiconductor, the semiconductor becomes opaque to the signal laser beam. As a result, instead of propagating through the semiconductor, the signal laser beam is reflected or switched.

The switches described above are all dependent on changes in the reflectivity or degree of transparency at an interface between two materials. As mentioned above, these changes are the result of the photorefractive effect where one of the materials has a non-linear refractive index. Hence, these devices operate on the principle that no light is transmitted through an interface between two dissimilar materials when the angle of light ray incidence is greater than that of the critical angle. The critical angle is a function of the ratio of the refractive indexes of the two materials.

These switches work by changing the refractive index of one of the materials thereby changing the critical angle. If this new critical angle is greater than the angle of incidence of the controlled beam, then transmission occurs with a subsequent decrease in reflection. The refractive index of one of the materials is changed by the photorefractive effect and thus constitutes a light activated light valve or switch. The effects described above are due generally to critical angle changes as a result of the photorefractive effect.

As an additional point, it is important to note that all of these devices are dependent on "localized" effects. The materials used in these devices are modified in their optical properties or at a localized point, and not throughout the material.

The need for efficient high speed optical switching devices is clear. As mentioned above, the use of optical fiber communications systems in now widely accepted and is expected to increase in importance. Since optical fiber communications are fast, traveling at the speed of light through the subject medium, the speed of the switching device used is likely to be the factor which limits the speed at which the system can function.

While numerous devices have been constructed which combine optical and mechanical elements to form a switch, a motor of some type is generally used to move a lens or mirror such that the direction of a subject light beam can be changed. The time that it takes for such a motor to operate, however, will be high in comparison to the speed at which the light travels through the system. As a result, the use of conventional motors coupled with conventional lenses will produce a relatively slow system.

In addition, it is critical that the switch not significantly distort the switched signal. Excessive distortion will cause the signal to be degraded and possibly lose its usefulness. Thus, switches are required which are not only quick but are also efficient in that they do not produce signal noise.

It will be appreciated that the use of light beams coupled with high speed efficient switches may have application in an optical computer. The importance of optical switches in the construction of a computer resides in the speed with which those switches may potentially operate and the capacity of such switches to process information. Because of physical considerations, switching times within current electronic switches are generally on the order of nanoseconds ($10^{-9}$). Switching times in electronic switches are not expected to increase significantly because of the physical limitations.

In the event a switch could be produced which was totally optical and did not require electronic or mechanical components, switching times would be expected to be on the order of picoseconds ($10^{-12}$). This would be approximately 1000 times faster than the switching times of conventional electronic switches. Thus, if an acceptable optical switch could be constructed for use in a computer, it appears feasible that such a computer could be approximately 1,000 times faster than conventional computers.

An additional advantage of the optical switch is the potential for such a switch to process more than one signal at a time. Since there is no particular interference between parallel beams of light, it may be possible for two or more distict signals to be processed simultaneously. Conventional electronic devices are obviously not able to process multiple streams of electrons simultaneously because of the electrical and magnetic interaction among electrons.

As previously mentioned, one desirable feature of the use of optics generally is the fact that there is no magnetic or electrical interference or distortion. Light beams are not subject to changes in electrical fields since they are composed of photons rather than electrons. As a result, a switch which could operate independent of electric or mechanical devices would be a significant improvement in the art. In addition, it appears highly probable that if such a switch could be constructed, response times in the order of picoseconds would be possible.

It is apparent that what is needed in the art are methods and apparatus for constructing an optical switch capable of operation independently of electrical and mechanical devices and which does not rely on localized changes in refractive index as described by Snell's law. It would be a major advancement in the art if such a switch could be constructed which had picosecond response times.

It would be a further advancement in the art if such a switch could be constructed which could employ solids, liquids, or gases as switching media. It would also be an advancement in the art if such a switch could be constructed which was capable of switching multiple parallel beams. It would be a still further advancement in the art if an optical switch could be constructed which was capable of switching a high power light beam using a relatively low power light beam, thereby effectively constituting an amplifier in the light beam.

Such inventions capable of achieving these advances over the prior art devices are disclosed and claimed herein.

BRIEF SUMMARY AND OBJECTS OF THE INVENTION

The present invention is related to an optically actuated optical switch which is capable of switching an optical beam without employing electrical or mechanical devices. In addition, the optical switch of the current invention is not dependent on localized changes in refractive index at an interface with a non-linear material, as described by Snell's Law. It is anticipated that the current invention will be capable of operation, and have switching times, in the range of picoseconds—approximately 1,000 times faster than the nanosecond range switching times of conventional electrical switches.

The current invention comprises at least two light beams. The first beam comprising the signal or switched beam, and the second beam comprising the switching or control beam. The current invention contemplates directing these beams through a switching medium. The switching medium may be a solid, liquid, gas, or supercritical gas as long as it has the required characteristics which are more fully discussed below.

In operation, the signal beam is directed through the switching medium. The refractive index of the switching medium causes the signal beam to exit the switching medium along a predetermined path. This may be thought of as a zero or rest state. When it is desired to switch the signal beam, the control beam is directed into the switching medium. The switching medium and the control beam are chosen so that the switching medium absorbs at least a portion of the energy of the control beam. Thus, a thermal gradient is established within the switching medium.

This thermal gradient which is established within the switching medium causes a change in the refractive index of the affected portion of the medium. If the two light beams propagate in a colinear geometry, the change in refractive index will be essentially symmetrical and can be thought of as a thermal lens formed within the switching medium.

A similar effect is observed even if the beams do not propagate colinearly, however, the signal beam is considered to be deflected as a result of the thermal gradient and resulting change in refractive index. It will be appreciated that neither configuration relies on the change of refractive index at the interface of a non-linear material as do the prior art devices. In addition, the current invention is not limited to a localized change in the refractive index.

As a result, sensors or detectors may be placed such that one detector receives the signal beam while the control beam is off. The second detector is positioned such that it receives the signal beam when the control beam is on and the signal beam is deflected by the resulting change in refractive index within the switching medium.

It will be appreciated that this type of optical switch is capable of broad application. For example, the switch may be used in communications and the detectors may be optical fibers which form a portion of a communications system. Alternatively, the switch may be part of an optical computer or may be used to construct logic gates within the computer. In addition, it will be appreciated that the current invention is capable of fast operation and has the capability of processing large quantities of information.

A related benefit of the current invention is that a small switching beam may be capable of switching a large control beam so that the device acts as an amplifier. Since the switch is totally optical, it is expected that picosecond response times are achievable. Moreover, because the light beams do not interact, it is possible to process multiple signal beams simultaneously and to have a beam function as both a signal beam and a control beam.

It is, therefore, an object of the current invention to provide an optically activated optical switch.

It is a further object of the current invention to produce an optically activated optical switch by creating thermal deflection or a thermal lens effect within a switching medium.

It is also an object of the current invention to produce an optical switch capable of picosecond response times.

It is another object of the current invention to produce an optical switch which operates without the use of electric or mechanical devices.

It is a further object of the current invention to produce an optical switch suitable for use as an effective optical amplifier.

These and other objects of the invention will become apparent upon reading the following detailed description and appended claims, and upon reference to the accompanying drawings.

DETAILED DESCRIPTION OF PREFERRED EMBODIMENTS

The present invention is directed to an optically actuated optical switch apparatus and methods. Specifically, the switch of the current invention is operated without the use of electrical or mechanical devices and may operate independently of conventional optical devices such as conventional mirrors and lenses. Rather than employing conventional electrical, mechanical, or optical components, the current invention relies upon the presence or absence of a transient, optically induced, refractive index gradient within a switching medium. This refractive index gradient is sufficient to switch an input signal beam from one output path to another output path.

Figure 1:
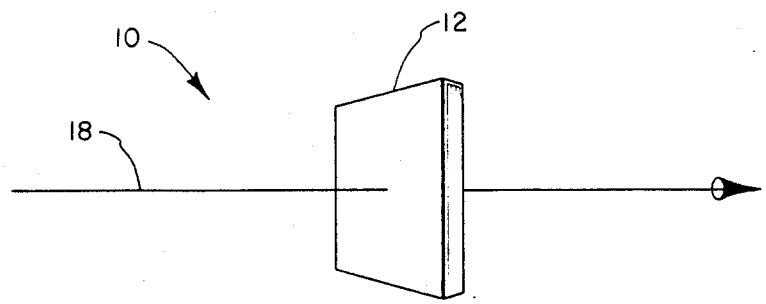
FIG. 1 illustrates diagrammatically the optical switch of the current invention with the control beam off.
Figure 2:
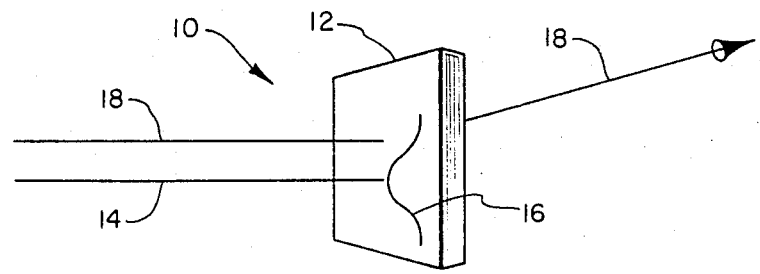
FIG. 2 illustrates the optical switch of the current invention with the control beam on and with the resulting refractive index gradient represented graphically.

The basic concept employed in the operation of the optical switch of the present invention can be understood by reference to FIGS. 1 and 2, wherein like numerals are used to designate like parts throughout. The switch of the present invention is generally designated 10. In FIG. 1, the signal beam 18 is illustrated passing through switching medium 12. As illustrated in FIG. 1, the signal beam 18 passes through switching medium 12 with no deflection. The state illustrated in FIG. 1 may be thought of as the rest or off position even though, for the applications discussed below, a detection device or optical fiber will likely be positioned so that signal beam 18 is detected while the switch is in the rest state.

When it is desired to switch the signal beam from its rest position to a switched position, a switching or control beam 14, as shown in FIG. 2, is directed into the switching medium 12. The frequency of control beam 14 and the material comprising switching medium 12 are chosen so that control beam 14 is at least partially absorbed by switching medium 12.

When the energy of control beam 14 is absorbed by switching medium 12, heat is produced creating a thermal gradient within switching medium 14. This thermal gradient is graphically represented by curve 16 illustrated in FIG. 2. This thermal gradient, in turn, results in a change in the refractive index of the switching medium. This change in the refractive index may be generally thought of as a prism formed within the switching medium 12. The characteristics of the prism are controlled by the intensity and distribution of the thermal gradient established within the switching medium 12.

It will be appreciated that while refractive index changes due to a thermal gradient are emphasized, refractive index changes may be created by alternative mechanisms. For example, refractive index changes may be created due to spectroscopic transitions excited by the control beam 14, photochemical transformations induced by the control beam 14 or other physical phenomena within the switching medium 12 caused by the control beam 14.

The switching time of the switch may be varied as desired by appropriate choice of a switching medium 12. The "turn on" time will be controlled by the time necessary to create a thermal gradient within the switching medium 12, or the "rate of thermalization." The "turn off" time, conversely, will be controlled by the rate at which the thermal energy is dispersed by switch medium 12, or the "rate of thermal conduction." Materials may be chosen having fast or slow turn on and turn off times depending on the particular application of the switch.

One advantage of the switch of the current invention is the wide range of possible materials for use as a switching medium 12. Any material having the desired characteristics regarding the establishment of a thermal gradient, and a resulting thermal lens, when contacted by the control beam 14, will be acceptable. The physical state of the material is not necessarily determinative; thus, solid, liquid or gaseous materials may be used. It may be preferable, however, to choose a switching medium 12 which is a gas or supercritical gas in order to avoid any problem due to the lack of homogeneity within the material.

Figure 6:
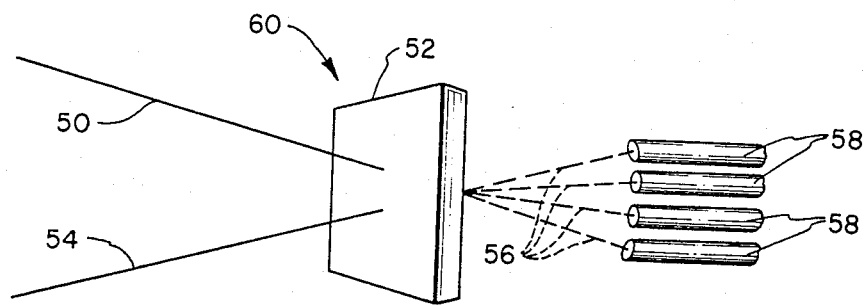
FIG. 6 is a schematic illustration of a switch configuration having multiple output positions.

An additional advantage of the current invention is the possibility of providing multiple switching positions within a single switch. Such a configuration is represented in FIG. 6. The switch 60 illustrated in FIG. 6 is virtually identical to switch 10 illustrated in FIGS. 1 and 2. The switch 60 in FIG. 6 comprises a switching medium 52, a signal beam 50 and a control beam 54.

The switch 60 is constructed so that signal beam 50 may be refracted along a plurality of output paths 56 into any one of a plurality of detection means 58. The detection means 58 may, for example, be optical fibers. The amount of refraction is controlled by the curvature of the thermal lens created within the switching medium 52, which in turn is determined by the intensity of control beam 54.

A particular intensity of control beam 54 may be chosen in order to refract signal 50 through a desired angle so that it is detected by the desired detector 58. Thus, multiple switching positions are achievable using a single optically actuated switch by simply varying the intensity of control beam 54. This is a significant advancement over prior art optical switches which generally have a single, fixed refraction angle, or alternatively use slow and cumbersome electrical and mechanical devices to change the beam path.

Figure 7:
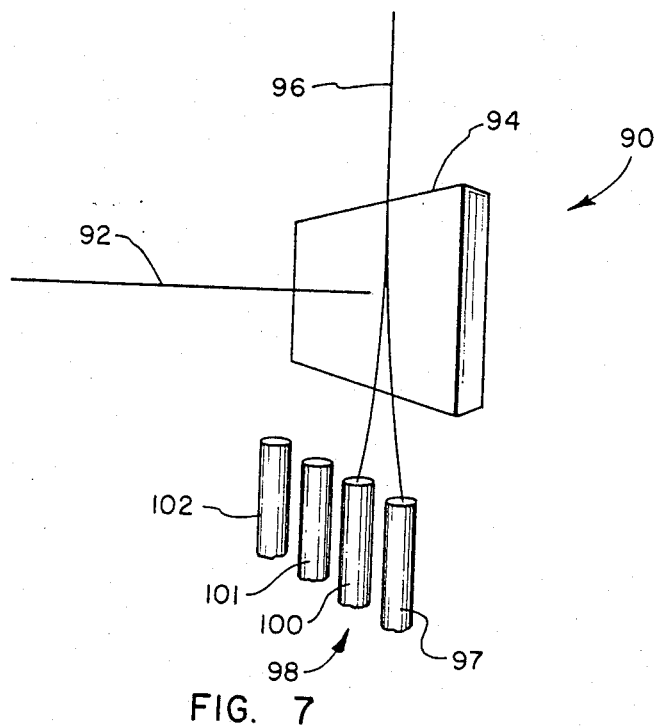
FIG. 7 illustrates an alternative embodiment of the current invention with the signal beam entering the switch from the top.

An alternative embodiment 90 of the current device is illustrated in FIG. 7. In FIG. 7 a control beam 92 is directed into and heats a solid surface 94. Control beam 92 is completely absorbed by the solid surface 94. The signal beam 96 enters the top of surface 94 passing as close as possible to the irradiated portion of surface 94.

An optical fiber array, designated 98 is positioned below surface 94. When control beam 92 is off, signal beam 96 will pass into optical fiber 97. However, when control beam 92 is turned on and surface 94 is heated, signal beam 96 will be deflected into one of the of the optical fibers 100, 101, or 102.

The embodiment of the device illustrated if FIG. 7 is expected to have some significant advantages. First, there is a high degree of optical isolation between the control beam 92 and the signal beam 96 since, ideally, all of the control light is absorbed at surface 94. This isolation is important in switching and amplification where the control light does not contain any information, and leakage of this light into the signal beam output section (the optical fibers 97, 100, 101, and 102) would constitute undesirable "noise."

Second, due to the great amount of optical isolation and the greater theoretical refractive index gradients that can be produced at an abrupt interface, the switching and amplification characteristics will be optimized. That is, less control beam power will be required for the same degree of deflection. This is desirable since the gain of the optical circuit will be greater. Finally, the device may prove to be easier to manufacture and be more reliable than the parallel beam device described with reference to FIGS. 1 and 2.

Figure 3:
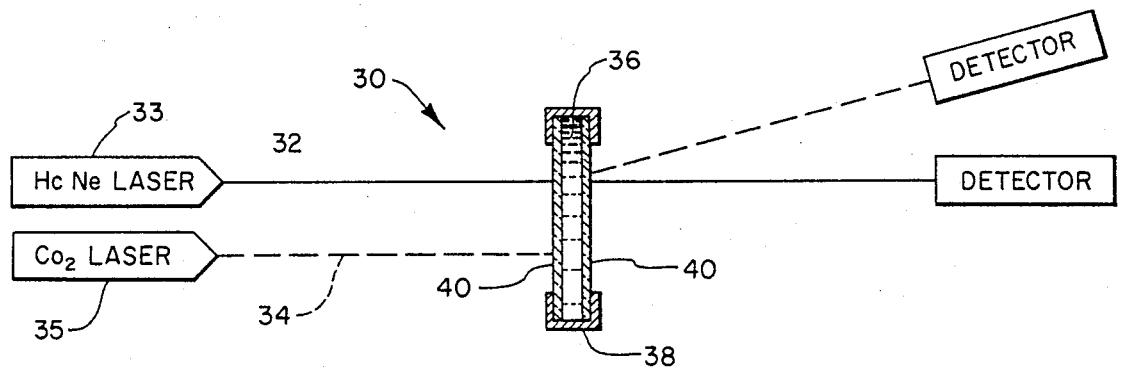
FIG. 3 is a schematic drawing illustrating one embodiment of the current invention employing a helium-neon signal laser and a carbon dioxide control laser.

An additional embodiment of the switch of the current invention is illustrated in FIG. 3 and is generally designated 30. In this embodiment, the signal beam 32 is produced by a helium-neon laser 33, and the control beam 34 is produced by a carbon dioxide laser 35. The switching medium 36 used in this embodiment is a mixture of an absorbing gas and an inert gas. One suitable absorbing gas is dichlorodifluromethane (commonly known as "FREON 12") and an acceptable inert gas is argon.

The total pressure of the switching medium 36 may be approximately 1 atmosphere, and the partial pressure of FREON 12 in this particular embodiment is less than 0.015 atmosphere. The absorbing medium may be contained within a gas cell 38 constructed of stainless steel and having sodium chloride windows 40. Sodium chloride windows are used because of their high transmission of the infrared light signals produced by the carbon dioxide control laser.

The carbon dioxide laser 35 operates at a wavelength of $10.6\mu$ and delivers a pulse of light of about 170 nanoseconds in duration and having 0.1 Joules of energy. The helium-neon laser 33 operates at a wavelength of $0.6328\mu$ and has an average continuous power of about 5 milliwatts.

When using this particular embodiment of the current invention it is found that the point of illumination of the helium-neon signal beam 32 measured one meter from the cell 38 moves approximately 1 cm. in response to the carbon dioxide control beam 34.

As mentioned above, the working principle of the optical switch is the photothermal effect created by the control beam. Governing equations are shown below which assume an optical beam propagating in the transverse electric zero mode ("$TEM_{00}$ mode"). Optical-optical switching comprises a spatial deflection and requires more than one light beam to pass through or into a switching medium.

Passage of the control beam through a switching medium with a finite absorption cross-section for radiation at the wavelength of this beam will result in energy transfer to this medium. This energy is converted by two main mechanisms: (1) re-emission of light and (2) thermalization. Both processes will always occur to a greater or lesser extent.

The optical switch depends on the thermalization of the absorbed energy, and one of the criteria for the switching medium is that loss of energy via emission of radiation be a minor mechanism. For an optically thin medium with negligible radiative energy loss, the temperature distribution induced by a fast pulsed excitation source is $$\delta T(x,y,z,t) = -\delta T_o \, W_e \exp[-\lambda z] \int^t \chi'(t) \times$$

$$\frac{\exp[-2(x^2 + y^2)/(8k(t - t') + 8Dt + W_e^2)]}{8k(t - t') + 8Dt + W_e^2} \, dt'$$

where, $$\delta T_o = -2\lambda Q_o/\rho C_p \pi W_e^2$$

is the maximum on-axis (x, y=0) temperature change that can occur.

For the case where absorbed energy is fast and mass diffusion is negligible, e.g., in a solid medium, the above equation reduces to $$\delta T(x,y,t) = \frac{-\delta T_o \, W_e^2 \exp[-2(x^2 + y^2)/(8Kt + W_e^2)]}{8Kt + W_e^2}$$

for an optically thin medium. This equation describes the entire temporal and spatial dependence of the temperature.

The minimum temperature change "turn on" time is governed by the rate of thermalization whereas the minimum "turn off" time is governed by the rate of thermal conduction related to the phenomenological thermal diffusivity constant K. In the present discussion, only the overall switching characteristics of the optical switch will be demonstrated by asserting K to be zero. The temperature in the medium is then described by $$T(x,y) = T_o + \delta T(x,y) = T_o + \delta T \exp[-2(x^2+y^2)/W_e^2]$$

The propagation of an optical beam through a medium of spatially variant refractive index is $$\frac{\partial}{\partial s}\left(\eta_o \frac{\partial r_o}{\partial s}\right) = \nabla_\perp \eta(x,y)$$

where s is the ray path, n is the refractive index and $r_0$ is the radial distance from the ray path.

The refractive index of the thermalized medium is $$\eta(x,y) = \eta_o + \frac{\partial \eta}{\partial T} \delta T(x,y)$$

The angular deviation of the switched beam is calculated by the ray path integral $$\phi = \frac{\partial r_o}{\partial s} = \frac{1}{\eta_o} \int \nabla_\perp \eta(x,y) \partial s$$

and thus $$\phi = \frac{1}{\eta_o} \frac{\partial \eta}{\partial T} \int \nabla_\perp T(x,y) \partial s$$

and the thermally induced angle for a TEM$_{00}$ control beam is $$\phi = \frac{-4l}{\eta_o} \frac{\partial \eta}{\partial T} \delta T \frac{x \, e^{-2x^2/W_e^2}}{W_e^2}$$

The signal beam is also affected by the curvature of the index gradient. A curvature in the gradient results in the formation of a lens with effective focal lengths given by $$1/F_i = -\frac{1}{\eta_o} \frac{\partial \eta}{\partial T} \int \frac{\partial^2 \eta}{\partial \delta i^2} ds \quad i = x,y$$

and thus, $$1/F_x = \frac{-4l\partial T}{\eta_o \, W_e^2} \frac{\partial \eta}{\partial T} e^{-2x^2/W_e^2} \left[1 - \frac{4x^2}{W_e^2}\right]$$

$$1/F_y = \frac{-4l\partial T}{\eta_o \, W_e^2} \frac{\partial \eta}{\partial T} e^{-2x^2/W_e^2}$$

a maximum deflection angle, and therefore optimum switching, occurs when the change in $\phi$ with respect to the control to signal beam displacement, x, is zero. This occurs at the location; $x = w_e/2$. This, the following equation results:

$$\phi_{max} = \frac{-1.213}{\eta_o} \frac{\partial \eta}{\partial T} \frac{l}{W_e^2} \delta T$$

The focal length with respect to the deflection axis coordinate, x, is infinite (e.g., no change in focal length) and that perpendicular to the deflection axis, y, is $$1/F_y = \frac{2.426}{\eta_o} \frac{\partial \eta}{\partial T} \frac{l}{W_e^2} \delta T$$

As is readily evident, efficient and fast optical switch has been described above. This switch is capable of a wide variety of applications. As mentioned, one major expected application will be in the area of fiber optic communications. Currently, slow and cumbersome switches are used to switch communications signals among optical fibers. These devices primarily employ conventional electrical, mechanical and optical devices and, as a result, slow the communications system.

The current invention is capable of picosecond response times so that the speed of the fiber optic communication is not significantly reduced. In addition, as illustrated in FIG. 6, the switch 60 of the current invention is capable of switching a signal beam 60 into any one of a plurality of detectors 58. Thus, a communications signal could be switched into a variety of paths.

An additional advantage of the current invention over conventional switches is the low cost of materials. The switching media and the associated gas cells 40 are conventional and easily obtainable materials. In addition, the expected use of fiber optics for many applications reduces the cost of the associated communications system for transporting signal and control beams.

A further advantage of the current invention is that it operates free of electricity or electrical devices. Thus, problems encountered when electrons interfere with the flow of other electrons are avoided. Accordingly, noise and interference are reduced or eliminated in the present invention. In addition, the present invention makes it possible for multiple signal beams to pass through the switch without those beams interfering with one another in any damaging manner.

Another important application of the present invention is expected to be in the construction of optical logic gates, resulting in optical computers. The desirability of constructing an optical computer has been recognized for some time. Until now, however, no acceptable optical switch or optical logic had been developed. For example, one proposed logic gate employed the well-known Fabry-Perot inferometer to reinforce or reduce the power of an optical signal in order to construct "and", "or", and "not" gates. The current invention enables the construction of simple and efficient logic gates.

Figure 4:
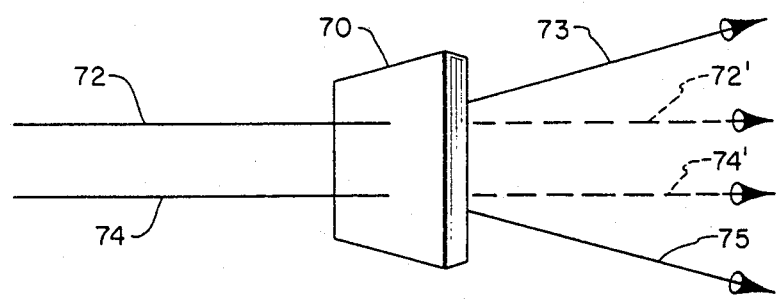
FIG. 4 illustrates the use of the current invention as an "and" gate.
Figure 5:
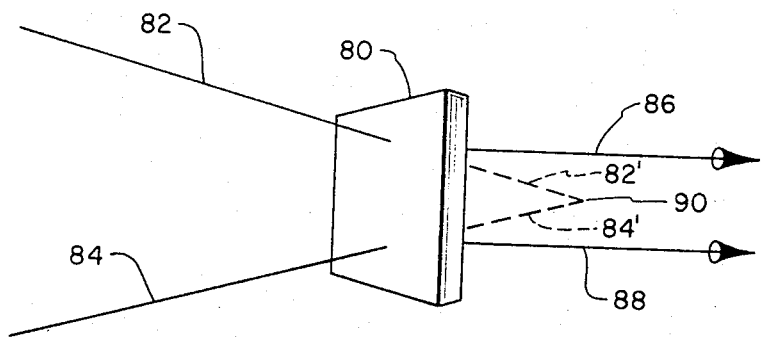
FIG. 5 illustrates the use of the current invention as an "or" gate.

FIGS. 4 and 5 illustrate possible general configurations of two such gates. In these gates, fiber optics may be used as the optical equivalent to a current path. FIG. 4 illustrates the optical equivalent of an electronic "and" gate. As with the other embodiments of the invention described above, the switch comprises a switching medium 70. Two input beams, designated 72 and 74, can be selectively directed into the switching medium 70.

When only beam 72 is directed into the switching medium 70, beam 72 exist along path 72'. Likewise, when only beam 74 is directed into the switching medium 70, beam 74 exits along path 74'. When both beams 72 and 74 are directed into switching medium 70, however, both beams are deflected because of the thermal lens effect created by the other beam. As a result, beams 72 and 74 exit the switch 70 along paths 73 and 75 respectively. Thus, detectors positioned along the deflected beam paths 73 and 75 will be capable of sensing when the switch is in the "and" state—that is, when both input beam 72 and input beam 74 are operating simultaneously.

A similarly constructed "or" gate is illustrated in FIG. 5. As described above, the switch is comprised of a switching medium 80. Again, two input beams 82 and 84 may be passed through the switching medium 80. When both input beams 82 and 84 are directed into the switching medium 80, the beams are deflected along pathways 86 and 88 respectively, by the thermal gradient created. However, when only input beam 82 or input beam 84 is directed into switching medium 80, the beam exits the switch along pathway 82' or 84' respectively. Thus, if a detector is positioned at point 90, it will be capable of determining when either beam 82 or 84 is operating, and the switch is in the "or" state.

As fully described above with reference to FIGS. 1 and 2, the switch of the current invention is fully capable of representing a "1" or "0" state. The "0" state may be chosen to be that illustrated in FIG. 1, where signal beam 18 passes directly through switching medium 12. The "1" state may likewise be chosen to be that illustrated in FIG. 2 where signal beam 18 is deflected by the thermal lens created by control beam 14.

As a result, it will be appreciated that the switch of the current invention possess all of the requisites for construction of an optical computer. The switch as 0 and 1 states and also is capable of being used as a logic gate as illustrated in FIGS. 4 and 5. This, coupled with the optical switch's capacity of simultaneously processing multiple signals, provides the capability of constructing an efficient high-speed computer.

An additional feature of the switch 10 is its ability to act as an amplifier. It will be appreciated that a relatively low power control beam 14, as shown in FIG. 2, will be capable of refracting or deflecting a relatively high power signal beam 18. This beam steering is active at input power levels which are much lower than those commonly associated with optically activated beam steering.

There are several features of this device which make it very useful. First, because of the fact that the temperature gradient established is perpendicular to the direction of propagation of the control beam, a high degree of optical isolation between the steered signal beam and the control beam can be achieved. As mentioned above, analogous situation in electronics is found in the operational amplifier with its high input impedance and low output impedance.

Second, since the medium can be chosen such as to only interact with the controlled beam through refractive index changes, the attenuation of this beam in the medium can be insignificant. Further, the spatial steering mechanism will not depend on the signal beam input power.

As a result, a high power beam can be steered by a relaively low powered control beam. An electronic analog of this is the field effect transistor, where the flow of electrons through the semiconductor is controlled by a small potential at the gate of this device. Another feature of this device that has a direct analog in electronics is that the gain bandwidth product can be made nearly constant. This characteristic is again analogous to the electronic operational amplifier.

In summary, the present invention includes optically actuated optical switch and apparatus and methods. The switch is capable of operation without the use of conventional mechanical, electrical, or optical devices and is capable of achieving picosecond range response times.

The switch of the current invention functions by the creation of a thermal lens or transient refractive index gradient in a switching medium such that the switching medium may be a solid, liquid or gas. Because the switch is totally optical, it is possible to use the current invention to simultaneously switch multiple input beams. Furthermore, the device may function as an amplifier in that a relatively low power control beam may switch a relatively high power signal beam. Finally, the switch of the current invention is fully capable of forming the basis of an optical computer. Logic gates may be constructed and the switch is fully capable of representing the "0" and "1" states so that such switches could be combined to produce a high-speed optical computer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An optically actuated optical switch comprising:
   means for providing a first optical beam directed into a switching medium, the switching medium being substantially transparent to the first optical beam;
   means for selectively providing a second optical beam, said second optical beam being directed into the switching medium and being at least partially interactive with the switching medium, whereby a refractive index gradient is produced by the second optical beam within the switching medium such that the path of the first optical beam varies in response to the intensity of the second optical beam as the first optical beam passes through the switching medium.

2. An optically actuated optical switch as defined in claim 1 wherein said refractive index gradient results from a thermal gradient produced by said second optical beam.

3. An optically actuated optical switch as defined in claim 2 wherein said thermal gradient comprises a thermally induced prism.

4. An optically actuated optical switch as defined in claim 1 wherein said refractive index gradient is created by a photochemical effect induced by said second optical beam.

5. An optically actuated optical switch as defined in claim 1 wherein said switching medium is a solid.

6. An optically actuated optical switch as defined in claim 1 wherein said switching medium is a liquid.

7. An optically actuated optical switch as defined in claim 1 wherein said switching medium is gaseous.

8. An optically actuated optical switch as defined in claim 7 wherein said switching medium comprises a mixture of at least one absorbing gas and at least one inert gas.

9. An optically actuated optical switch as defined in claim 8 wherein said inert gas is argon.

10. An optically actuated optical switch as defined in claim 8 wherein said absorbing gas is dichlorodifluoromethane.

11. An optically actuated optical switch as defined in claim 1 wherein said switching medium is a supercritical gas.

12. An optically actuated optical switch as defined in claim 1 wherein said means for providing a first optical beam comprises a laser.

13. An optically actuated optical switch as defined in claim 12 wherein said laser comprises a helium-neon laser.

14. An optically actuated optical switch as defined in claim 1 wherein said means for selectively providing a second optical beam comprises a laser.

15. An optically actuated optical switch as defined in claim 14 wherein said laser produces a beam in the infrared region.

16. An optically actuated optical switch as defined in claim 14 wherein said laser is a carbon dioxide laser.

17. An optically actuated optical switch as defined in claim 16 wherein said means for selectively providing a second optical beam comprises a control means in communication with said carbon dioxide laser.

18. An optically actuated optical switch comprising:
a switching medium;
laser means for providing a signal beam directed into said switching medium, said switching medium being substantially transparent to said signal beam;
laser means for selectively providing a control beam, said control beam being directed into said switching medium and being at least partially absorbed by said switching medium whereby a refractive index gradient is produced by said control beam within said switching medium such that the path of the signal beam varies in response to the intensity of the control beam as the signal beam passes through said switching medium.

19. An optically actuated optical switch as defined in claim 18 wherein said laser means for providing a signal beam comprises a helium-neon laser.

20. An optically actuated optical switch as defined in claim 19 wherein said laser means for selectively providing a control beam comprises a laser which produces a beam in the infrared region.

21. An optically actuated optical switch as defined in claim 20 wherein said laser means for selectively providing a control beam comprises a carbon dioxide laser.

22. An optically actuated optical switch as defined in claim 21 wherein said refractive index gradient is created by a thermal gradient produced within said switching medium by said control beam.

23. An optically actuated optical switch as defined in claim 22 wherein said thermal gradient comprises a thermally induced prism.

24. An optically actuated optical switch as defined in claim 21 wherein said refractive index gradient is created by a photochemical effect induced by said control beam.

25. An optically actuated optical switch as defined in claim 18 wherein said switching medium is a solid.

26. An optically actuated optical switch as defined in claim 18 wherein said switching medium is a liquid.

27. An optically actuated optical switch as defined in claim 18 wherein said switching medium is gaseous.

28. An optically actuated optical switch as defined in claim 27 wherein said switching medium comprises a mixture of one or more absorbing gases and one or more inert gases.

29. An optically actuated optical switch as defined in claim 28 wherein said inert gas is argon.

30. An optically actuated optical switch as defined in claim 28 wherein said absorbing gas is dichlorodifluoromethane.

31. An optically actuated optical switch as defined in claim 18 wherein said switching medium is a supercritical gas.

32. An optically actuated optical switch as defined in claim 18 wherein said control beam is capable of a plurality of intensities such that said signal beam is capable of being directed into a plurality of output paths.

33. An optically actuated optical "and" logic gate comprising:
a switching medium;
means for selectively directing a first input beam through said switching medium, said first input beam being chosen such that said first beam is partially absorbed by said switching medium thereby creating a thermal gradient within said switching medium when said beam passes through said switching medium;
means for selectively directing a second input beam through said switching medium, said second input beam being chosen such that said second beam is partially absorbed by said switching medium thereby creating a thermal gradient within said switching medium when said beam passes through said switching medium, whereby the path of the first input beam varies in response to the second input beam as the first input beam passes through the switching medium and the path of the second input beam varies in response to the first input beam as the second input beam passes through the switching medium; and
detection means positioned so as to detect at least one of said input beams while both beams are directed through said switching medium.

34. An optically actuated optical "or" logic gate comprising:
a switching medium;

means for selectively directing a first input beam through said switching medium;

means for selectively directing a second input beam through said switching medium;

said switching medium and said first and second input beams being chosen such that said beams are partially absorbed by said switching medium thereby creating a thermal gradient within said switching medium when said beams pass through said switching medium, whereby the path of the first input beam varies in response to the second input beam as the first input beam passes through the switching medium and the path of the second input beam varies in response to the first input beam as the second input beam passes through the switching medium; and detection means positioned so as to detect said input beams while only one beam is directed through said switching medium.

35. An optically actuated optical amplifier comprising:

a switching medium;

means for providing a signal beam directed into said switching medium, said switching medium being substantially transparent to said signal beam; and means for selectively providing a control beam, said control beam having less power than said signal beam, said control beam being directed into said switching medium and being at least partially absorbed by said switching medium, whereby a refractive index gradient is produced by said control beam within said switching medium such that the path of the signal beam varies in response to the intensity of the control beam as the signal beam passes through said switching medium.

36. An optically actuated optical switch comprising:

a switching medium;

means for providing a signal beam directed into said switching medium being substantially transparent to said signal beam;

means for selectively providing a control beam, said control beam being capable of consisting of a plurality of intensities, said control beam being directed into said switching medium and being at least partially absorbed by said switching medium, whereby a refractive index gradient is produced by said control beam within said switching medium such that the path of the signal beam varies in response to the intensity of the control beam as the signal beam passes through said switching medium; and a plurality of means for detecting said signal beam as it exits said switching medium, the position of said detecting means being chosen to correspond to the paths of said signal beam at the various intensities of said control beam.

* * * * *

UNITED STATES PATENT AND TRADEMARK OFFICE
CERTIFICATE OF CORRECTION

PATENT NO. : 4,585,301

DATED : April 29, 1986

INVENTOR(S) : Stephen E. Bialkowski

It is certified that error appears in the above-identified patent and that said Letters Patent is hereby corrected as shown below:

Column 1, line 47, "are" should be --is--
Column 1, line 49, "are" should be --is--
Column 1, line 62, "are" should be --is--
Column 2, line 54, "it is" should be --it has--
Column 4, line 54, "comprising" should be --comprises--
Column 4, line 55, "comprising" should be --comprises--
Column 5, line 12, "colinearly, however," should be --colinearly; however,--
Column 7, line 65, "if FIG. 7" should be --in FIG. 7--
Column 10, line 20, "This," should be --Thus,--
Column 10, line 34, "efficient" should be --an efficient--
Column 11, line 20, "exist" should be --exits--
Column 11, line 54, "possess" should be --possesses--
Column 11, line 55, "as" should be --has--
Column 12, line 7, "analogous" should be --an analogous--
Column 12, line 17, "relaively" should be --relatively--

Signed and Sealed this

Twelfth Day of August 1986

[SEAL]

Attest:

DONALD J. QUIGG

Attesting Officer

Commissioner of Patents and Trademarks